United States Patent
Kuroda et al.

(10) Patent No.: US 11,715,584 B2
(45) Date of Patent: Aug. 1, 2023

(54) COAXIAL CABLE AND CABLE ASSEMBLY

(71) Applicant: Hitachi Metals, Ltd., Tokyo (JP)

(72) Inventors: Hiromitsu Kuroda, Tokyo (JP); Tamotsu Sakurai, Tokyo (JP); Keisuke Fujito, Tokyo (JP); Yoshiki Nakade, Hitachi (JP); Detian Huang, Tokyo (JP); Hideki Nonen, Tokyo (JP)

(73) Assignee: PROTERIAL, LTD., Tokyo (JP)

( * ) Notice: Subject to any disclaimer, the term of this patent is extended or adjusted under 35 U.S.C. 154(b) by 0 days.

(21) Appl. No.: 17/410,770

(22) Filed: Aug. 24, 2021

(65) Prior Publication Data

US 2022/0084723 A1    Mar. 17, 2022

(30) Foreign Application Priority Data

Sep. 15, 2020  (JP) ................................ 2020-155003
Nov. 12, 2020  (JP) ................................ 2020-188451

(51) Int. Cl.
  *H01B 11/10*   (2006.01)
  *H01B 11/18*   (2006.01)
  (Continued)

(52) U.S. Cl.
  CPC ..... *H01B 11/1808* (2013.01); *G01N 23/2252* (2013.01); *H01B 13/016* (2013.01); *H01B 13/225* (2013.01)

(58) Field of Classification Search
  CPC .......... H01B 5/10; H01B 7/226; H01B 9/025; H01B 11/1041
  See application file for complete search history.

(56) References Cited

U.S. PATENT DOCUMENTS 10,991,485 B2 *  4/2021  Huang ................. H01B 11/183
11,437,692 B2 *  9/2022  Huang ..................... H01P 3/06
(Continued)

FOREIGN PATENT DOCUMENTS

JP    2000-285747 A    10/2000
JP    2003-045244    *  2/2003
JP    2014-191884    * 10/2014

*Primary Examiner* — Chau N Nguyen
(74) *Attorney, Agent, or Firm* — McGinn I.P. Law Group, PLLC.

(57) ABSTRACT

A coaxial cable is composed of a conductor, an insulator around the conductor, a shield layer around the insulator, and a sheath around the shield layer. The shield layer includes a lateral winding shielding portion with metal wires helically wrapped around the insulator, and a batch plating portion covering the lateral winding shielding portion. The shield layer includes a joining portion where adjacent metal wires are joined with each other with the batch plating portion at a gap between the adjacent metal wires, and inner peripheral portions where the metal wires are not being covered with the batch plating portion and plating layers are exposed. The joining portion is provided between adjacent inner peripheral portions. When an elemental analysis is performed in any analysis region having an area of 0.015 mm$^2$ or more and 0.300 mm$^2$ or less in an insulator-side surface of the shield layer which is stripped from the insulator, an area of a chlorine present region where chlorine is present in the analysis region is 5% or less of an area of the analysis region.

19 Claims, 9 Drawing Sheets

(51) Int. Cl.
*G01N 23/2252* (2018.01)
*H01B 13/22* (2006.01)
*H01B 13/016* (2006.01)

(56) References Cited

U.S. PATENT DOCUMENTS

2021/0217542 A1* 7/2021 Chuganey .......... H01B 11/1821
2021/0399396 A1* 12/2021 Huang ...................... H01P 3/06

* cited by examiner

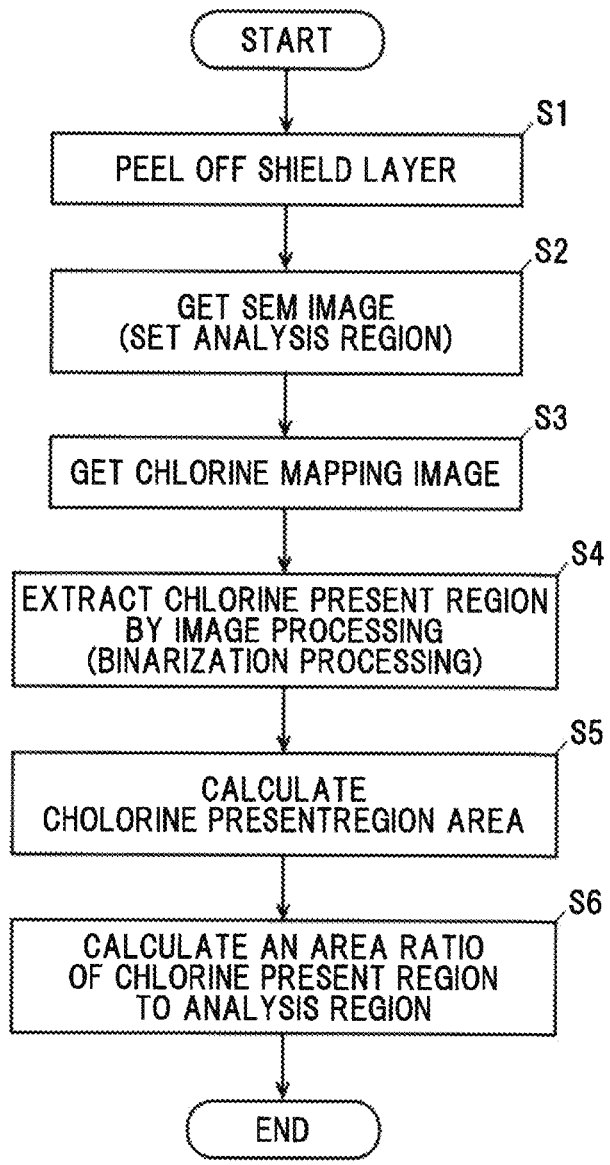

COAXIAL CABLE AND CABLE ASSEMBLY

CROSS-REFERENCE TO RELATED APPLICATION

The present application is based on Japanese patent application No. 2020-155003 filed on Sep. 15, 2020 and Japanese patent application No. 2020-188451 filed on Nov. 12, 2020, the entire contents of which are incorporated herein by reference.

BACKGROUND OF THE INVENTION

1. Field of the Invention

The present invention relates to a coaxial cable and a cable assembly.

2. Description of the Related Art

A coaxial cable is used as a cable designed to carry out a high frequency signal transmission and to be used as an internal wiring in an image recording device to be used in an automatic operation or the like, or as an internal wiring in an electronic device such as a smartphone or a tablet terminal or the like, or as a wiring in a machine tool such as an industrial robot or the like.

As the conventional coaxial cable, there is known one with a shield layer being configured in such a manner that a taping member such as a copper tape or the like provided with a copper foil on a resin layer is helically wrapped around a periphery of an insulator (see, e.g., JP2000-285747A).

[Patent Document 1] JP2000-285747A

SUMMARY OF THE INVENTION

However, in the conventional coaxial cable described above, there is a problem with a phenomenon called "suck-out" occurring, which refers to a rapid attenuation caused in a predetermined frequency band (e.g., a band of several GHz such as 1.25 GHz or the like).

On the other hand, for example, by configuring the shield layer in such a manner that the outer surface of the insulator is subjected to a plating, it is possible to suppress the occurrence of the suck-out. However, when the coaxial cable has been repeatedly bent, a crack formation in its shield layer made of the plating has occurred or a peeling off of that shield layer made of the plating from the outer surface of the insulator has occurred. The occurrence of the crack formation in its shield layer made of the plating or the peeling off of that shield layer made of the plating from the outer surface of the insulator has led to a degradation in the shielding effect. That is, the shielding effect of the shield layer on the noise caused in the coaxial cable has been degraded.

In light of the foregoing, it is an object of the present invention to provide a coaxial cable, and a cable assembly, which are designed to be resistant to the occurrence of a degradation in the shielding effect, and to be resistant to the occurrence of a rapid attenuation in a predetermined frequency band.

For the purpose of solving the aforementioned problems, one aspect of the present invention provides a coaxial cable, comprising:

a conductor;
an insulator covering a periphery of the conductor;
a shield layer covering a periphery of the insulator; and
a sheath covering a periphery of the shield layer, wherein the shield layer includes a lateral winding shielding portion comprising a plurality of metal wires being helically wrapped around the periphery of the insulator to cover the periphery of the insulator, and a batch plating portion comprising a hot dip plating, which is covering a periphery of the lateral winding shielding portion, wherein the shield layer includes a joining portion where the metal wires adjacent to each other in a circumferential direction are joined with each other with the batch plating portion at a gap where adjacent ones of the plurality of metal wires are spaced apart from each other, wherein the shield layer includes inner peripheral portions where the plurality of the metal wires are not being covered with the batch plating portion and plating layers are exposed, and wherein the joining portion is provided between adjacent ones of the inner peripheral portions.

Furthermore, for the purpose of solving the aforementioned problems, another aspect of the present invention provides a coaxial cable comprising:

a conductor;
an insulator covering a periphery of the conductor;
a shield layer covering a periphery of the insulator; and
a sheath covering a periphery of the shield layer, wherein the shield layer includes a lateral winding shielding portion comprising a plurality of metal wires being helically wrapped around the periphery of the insulator to cover the periphery of the insulator, and a batch plating portion comprising a hot dip plating, which is covering a periphery of the lateral winding shielding portion, and wherein when an elemental analysis is performed in any analysis region having an area of 0.015 $mm^2$ or more and 0.300 $mm^2$ or less in an insulator-side surface of the shield layer which is stripped from the insulator, an area of a chlorine present region where chlorine is present in the analysis region is 5% or less of an area of the analysis region.

Furthermore, for the purpose of solving the aforementioned problems, still another aspect of the present invention provides a coaxial cable comprising:

a cable assembly, comprising: the above defined coaxial cable; and a terminal member integrally provided to at least one end portion of the above defined coaxial cable.

Points of the Invention

According to the present invention, it is possible to provide the coaxial cable, and the cable assembly, which are designed to be resistant to the occurrence of a degradation in the shielding effect, and to be resistant to the occurrence of a rapid attenuation in a predetermined frequency band.

BRIEF DESCRIPTION OF THE DRAWINGS

Next, preferred embodiment according to the present invention will be described with reference to appended drawings, wherein:

FIG. 7 is a flow chart showing a process for analyzing a chlorine present region of the coaxial cable according to a second embodiment of the present invention;

DETAILED DESCRIPTION OF THE PREFERRED EMBODIMENTS

Embodiments

Embodiments of the present invention will be described below in conjunction with the accompanying drawings.

Figure 1A:
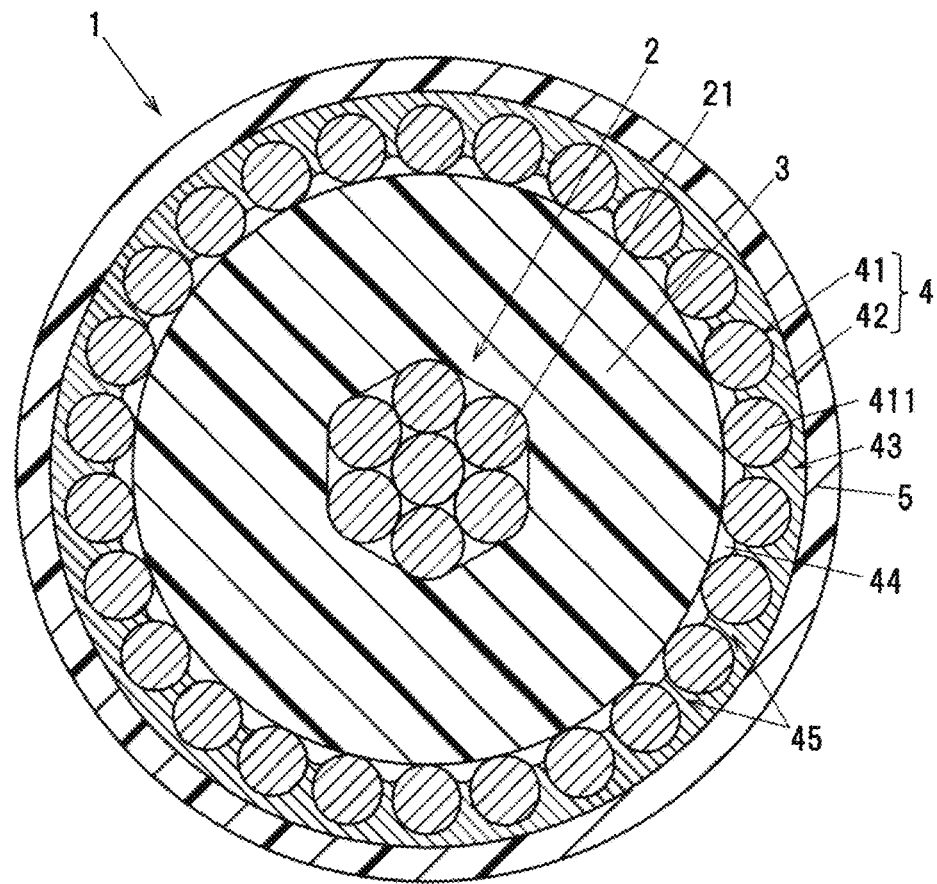
FIG. 1A is a cross-sectional view showing a cross section perpendicular to a longitudinal direction showing a coaxial cable according to a first embodiment of the present invention.
Figure 1B:
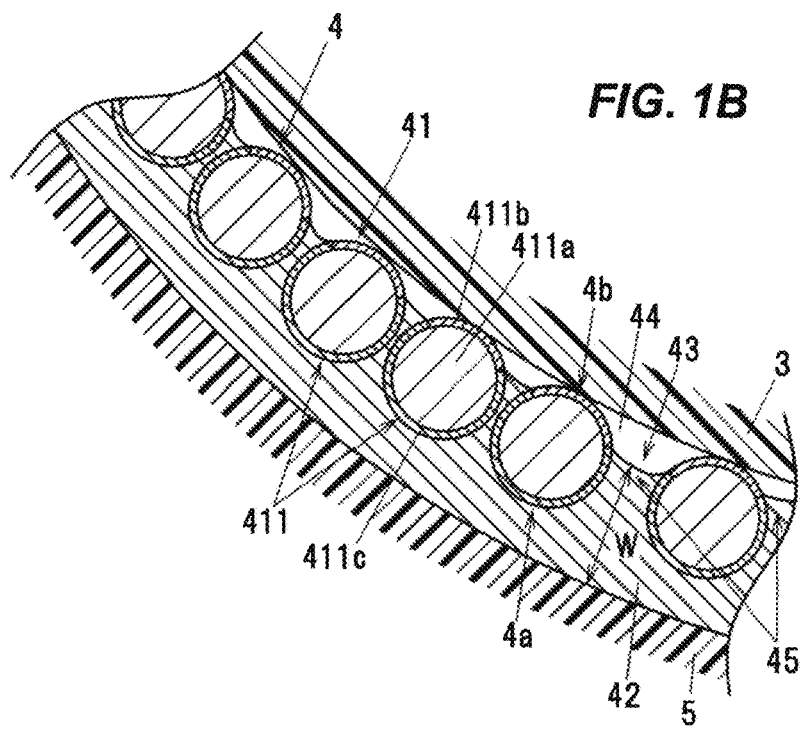
FIG. 1B is an enlarged view of an essential portion of the coaxial cable shown in FIG. 1A.

FIG. 1A is a cross-sectional view showing a cross section perpendicular to a longitudinal direction showing a coaxial cable 1 according to the present embodiment, and FIG. 1B is an enlarged view of an essential portion of the coaxial cable 1 shown in FIG. 1A.

As shown in FIGS. 1A and 1B, the coaxial cable 1 includes a conductor 2, an insulator 3, which is provided to cover a periphery of the conductor 2, and a shield layer 4, which is provided to cover a periphery of the insulator 3, and a sheath 5, which is provided to cover a periphery of the shield layer 4.

The conductor 2 is composed of a stranded wire conductor, which is formed by stranding a plurality of metal wires (strands, elementary wires) 21 together. In the present embodiment, the conductor 2 formed by stranding seven metal wires 21 each made of an annealed copper wire (soft coper wire) with an outer diameter of 0.02 mm is used. The configuration of the conductor 2 is not limited thereto, but the conductor 2 can also be configured to use a compressed stranded wire conductor, which is produced by stranding the plurality of metal wires 21 together, and subsequently subjecting the stranded metal wires 21 to a compression working in such a manner that the cross-sectional shape of the stranded metal wires 21, which is perpendicular to the longitudinal direction of the coaxial cable 1, becomes a circular shape. The use of the compressed stranded wire conductor as the conductor 2 allows the electrical conductivity of the conductor 2 to be enhanced, the good transmission property of the conductor 2 to be obtained, and the high bendability of the conductor 2 to be maintained. Further, the plurality of metal wires 21 may be configured to use a copper alloy wire including tin (Sn), silver (Ag), indium (In), titanium (Ti), magnesium (Mg), iron (Fe) or the like, from the point of view of enhancing the electrical conductivities and the mechanical strengths of the plurality of metal wires 21.

The insulator 3 is composed of, e.g., PFA (perfluoro alkoxy alkane), or FEP (fluorinated ethylene tetrafluoride/propylene hexafluoride copolymer) fluoropolymer resin, polyethylene, polypropylene or the like. The insulator 3 may be configured to use a foamed resin, or may be configured with a crosslinked resin in order to enhance the heat resistance of the insulator 3. Further, the insulator 3 may be configured to have a multi-layer structure. For example, the insulator 3 can also be configured to have a three-layer structure composed of a first non-foamed layer made of non-foamed polyethylene, which is covering a periphery of the conductor 2, a foamed layer made of foamed polyethylene, which is covering a periphery of the first non-foamed layer, and a second non-foamed layer made of non-foamed polyethylene, which is covering a periphery of the foamed layer. In the present embodiment, the insulator 3 made of PFA is formed over the periphery of the conductor 2 by tube extrusion. By forming the insulator 3 over the periphery of the conductor 2 by the tube extrusion, the insulator 3 is easily peeled off from the conductor 2 during termination working, and the termination workability is therefore enhanced.

The sheath 5 is composed of, e.g., fluoropolymer resin such as PFA or FEP or the like, polyvinyl chloride, crosslinked polyolefin, or the like. In the present embodiment, the sheath 5 made of fluoropolymer resin is formed by tube extrusion.

(Shield Layer 4)

In the coaxial cable 1 according to the present embodiment, the shield layer 4 includes a lateral winding shielding portion 41, which is formed by a plurality of metal wires 411 being helically wrapped around a periphery of the insulator 3, and a batch plating portion 42 having an electrical conductivity, which is provided to batch cover a periphery of the lateral winding shielding portion 41 together.

In the present embodiment, since the plurality of metal wires 411 are fixed with the batch plating portion 42, in order to ensure the high bendability of the coaxial cable 1, there is the need to use a metal wire made of a material having a low yield strength that is easily plastically deformed, in the plurality of metal wires 411. More specifically, a metal wire having a tensile strength of 200 MPa or more and 380 Pa or less and an elongation of 7 percent or more and 20 percent or less may be used in the plurality of metal wires 411.

In the present embodiment, for each of the plurality of metal wires 411, a silver-plated annealed copper wire having a plating layer 411b made of silver on the periphery of a metal wire 411a made of an annealed copper wire is used. Note that the metal wire 411a to be used in the plurality of metal wires 411 is not limited to the above annealed copper wire, but that a copper alloy wire, an aluminum wire, an aluminum alloy wire, or a wire rod having a low softening temperature with a trace amount of metal elements (e.g., titanium, magnesium, or the like) being added to a pure copper, or the like, can be used as the metal wire 411a to be used in the plurality of metal wires 411. Further, the metal for constituting the plating layer 411b to be used in the plurality of metal wires 411 is not limited to silver. For example, tin or gold may be used in the plating layer 411b. Herein, the lateral winding shielding portion(s) 41 are formed by using twenty-two (22) metal wires 411 made of a silver-plated annealed copper wire having an outer diameter of 0.025 mm.

Further, in the present embodiment, a plating portion made of tin is used in the batch plating portion 42 made of a hot dip plating. It should be noted, however, that the batch plating portion 42 is not limited thereto. For example, a plating portion made of silver, gold, copper, zinc or the like can be used in the batch plating portion 42. It should be noted, however, that, from the point of view of the ease of the production, it is more preferable to use the batch plating portion 42 made of tin. Further, an outer peripheral surface of the joining portion is located radially outward with respect to outer peripheral surfaces of the outer peripheral portions.

Figure 2:
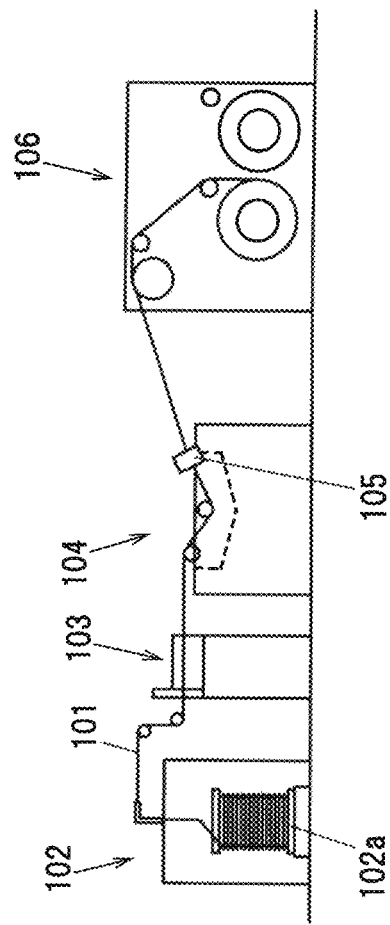
FIG. 2 is an explanatory diagram showing a formation of a batch plating portion.

FIG. 2 is an explanatory diagram showing a formation of a batch plating portion. First, before the formation of the batch plating portion 42, several metal wires 411 are stranded together around the insulator 3 to form the lateral winding shielding portion. The lateral winding shielding portion 41 formed around the insulator 3 is called as a cable base 101. When forming the batch plating portion 42, a drum 102a with the cable base 101 being wound therearound is set to an outfeed unit 102, and the cable base 101 is fed from the outfeed unit 102. The cable base 101, which is fed by the outfeed unit 102, is introduced into a flux bath (flux tank) 103, and the flux is applied around the cable base 101 (i.e., around the lateral winding shielding portion 41). The flux is designed to facilitate the adhesion of the molten tin to an entire periphery of the lateral winding shielding portion 41, and e.g., rosin-based flux or the like can be used. The cable base 101 after passing through the flux bath 103 is introduced into a plating tank 104, which contains the molten tin at a temperature between 250° C. and 300° C., and passes through a die 105. After passing through the die 105, the remaining tin is cooled to form the batch plating portion 42. In other words, the batch plating portion 42 is a molten plating layer formed by the molten plating. Then, the cable base 101 provided with the batch plating portion 42 is wound up by a winding unit 106. The wire velocity of the cable base 101 provided with the lateral winding shielding portion 41 is e.g., 40 m/min or more and 80 m/min or less, and preferably 50 m/min or more and 70 m/min or less.

In forming the batch plating portion 42, the silver constituting the plating layer 411b in the part of the metal wire 411 to be brought into contact with the molten tin (in other words, the hot dip plating) is diffused into that molten tin in the bath, and an intermetallic compound 411c including copper and tin therein is formed between the metal wire 411 and the batch plating portion 42 (in other words, in the part between the metal wire 411a and the batch plating portion 42, and in abutment with a surface of the metal wire 411). As a result of EDX analysis (analysis by energy dispersion type X-ray spectroscopy) using an SEM (scanning electron microscope) by the present inventors, the intermetallic compound 411c composed of copper and tin was identified as having occurred in the form of a layer on the surface of the metal wire 411 (between the metal wire 411 and the batch plating portion 42). That is, the intermetallic compound 411c is a compound formed with a compound layer on the surface of the metal wire 411 being produced by a metallic diffusion reaction between the metal element (tin, or the like), which constitutes the batch plating portion 42 made of a hot dip plating, and the metal element (copper, or the like), which constitutes the primary component of the metal wire 411. A thickness of a layer of the intermetallic compound 411c is on the order of e.g., from 0.2 μm to 1.5 μm. Note that although silver constituting the plating layer 411b is considered to be included in the intermetallic compound 411c, an amount of silver included in the intermetallic compound 411c is a trace amount which is difficult to be detect by the EDX analysis.

By the shield layer 4 being formed with the intermetallic compound 411c between the metal wire 411 and the batch plating portion 42, when the coaxial cable 1 is repeatedly subjected to a bending or a torsion, the batch plating portion 42 becomes resistant to the occurrence of a peeling off the surface of the metal wire 411, and becomes resistant to the occurrence of a gap formation between the metal wire 411 and the batch plating portion 42. As a result, in the coaxial cable 1, even when subjected to a bending or a torsion, the batch plating portion 42 is able to hold the lateral winding shielding portion 41 in a state of being fixed from the outer side of the lateral winding shielding portion 41, and thereby becomes resistant to the occurrence of a change in the distance between the shield layer 4 and the conductor 2. For that reason, it is possible to make the coaxial cable 1 resistant to the occurrence of a lowering in the shielding effect due to being subjected to a bending or a torsion, and also make the coaxial cable 1 resistant to the occurrence of a rapid attenuation in a predetermined frequency band. The thickness of the layer of the intermetallic compound 411c is obtained, for example by using an optical microscope or an electron microscope to observe the transverse cross section of the coaxial cable 1 (the cross section which is perpendicular to the longitudinal direction of the coaxial cable 1).

The plating layer 411b made of silver remains on the part of the metal wire 411 being not brought into contact with the batch plating portion 42 (i.e., the part of the metal wire 411 being not brought into contact with the tin melted during plating). That is, the plating layer 411b made of silver remains on the part of the metal wire 411 located inward (the insulator 3 side) in the radial directions of the coaxial cable 1. That is, the shield layer 4 in the coaxial cable 1 according to the present embodiment may be configured to be higher in the electrical conductivity in an inner peripheral portion 4b in which the plurality of metal wires 411 are not being coated with the batch plating portion 42, than in an outer peripheral portion 4a in which the plurality of metal wires 411 are coated with the batch plating portion 42. In the high frequency signal transmission, the electric current is concentrated in the insulator 3 side of the shield layer 4. Therefore, by providing the plating layer 411b including silver or the like having a high electrical conductivity in the inner peripheral portion 4b of the shield layer 4, it is possible to suppress the occurrence of lowering in the electrical conductivity of the shield layer 4, and thereby maintain the good attenuation property of the coaxial cable 1. The electrical conductivity of the tin plating constituting the batch plating portion 42 is 15% IACS, and the electrical conductivity of the silver plating constituting the plating layer 411b of the plurality of metal wires 411 is 108% IACS.

Note that the outer peripheral portion 4a refers to the portion in which the metal wire 411 is brought into contact with the plating (tin or the like) melted during hot dip plating (that is, the portion in which the intermetallic compound 411c is formed). The inner peripheral portion 4b refers to the portion in which the plating layer 411b made of a silver plating or the like is remaining.

(Explanation of the Joining Portion 43)

The shield layer 4 includes a gap (space) 45 where adjacent metal wires 411, 411 are spaced apart from each other in the circumferential direction of the coaxial cable 1. Note that all of the adjacent ones of the plurality of metal wires 411 in the circumferential direction are not necessarily spaced apart from each other, and some of the adjacent ones of the plurality of metal wires 411 in the circumferential direction may be brought into contact with each other to provide contacting portions. In each contacting portion, at the outer periphery of the lateral winding shielding portion 41, a space between the adjacent ones of the plurality of metal wires 411, 411 in the circumferential direction is filled with the batch plating portion 42, to provide a filled portion.

The shield layer 4 includes the joining portion 43 where the adjacent metal wires 411, 411 in the circumferential direction are joined with each other with the batch plating portion 42. It is desirable that the batch plating portion 42 is provided to batch coat the entire periphery of the lateral winding shielding portion 41 together in the circumferential direction and the axial direction of the coaxial cable 1, and mechanically and electrically connect the plurality of metal wires 411 together. In the shield layer 4 of the coaxial cable 1 according to the present embodiment, the joining portion 43 is provided between the adjacent inner peripheral portions 4b, 4b. Since a portion around the inner peripheral portion 4b is not coated by the batch plating portion 42, an air layer 44 is provided between the inner peripheral portions 4b, 4b of the adjacent metal wires 411, 411 and between the outer surface of the insulator 3 and the inner surface of the batch plating portion 42 (joining portion 43). As to the air layer 44, the inner surface of the joining portion 43 which is opposite to the outer surface of the insulator 3 has a curved shape so that it recesses toward the inner side of the joining portion 43. With this curved shape, an air layer 44 with a predetermined size can be generated between the outer surface of the insulator 3 and the inner surface of the joining portion 43. Thus, it is possible to achieve the coaxial cable 1, which is less likely to cause a reduction in the shielding effect and less likely to cause the rapid attenuation in a specific frequency band (for example, the frequency band up to 26 GHz).

Figure 3:
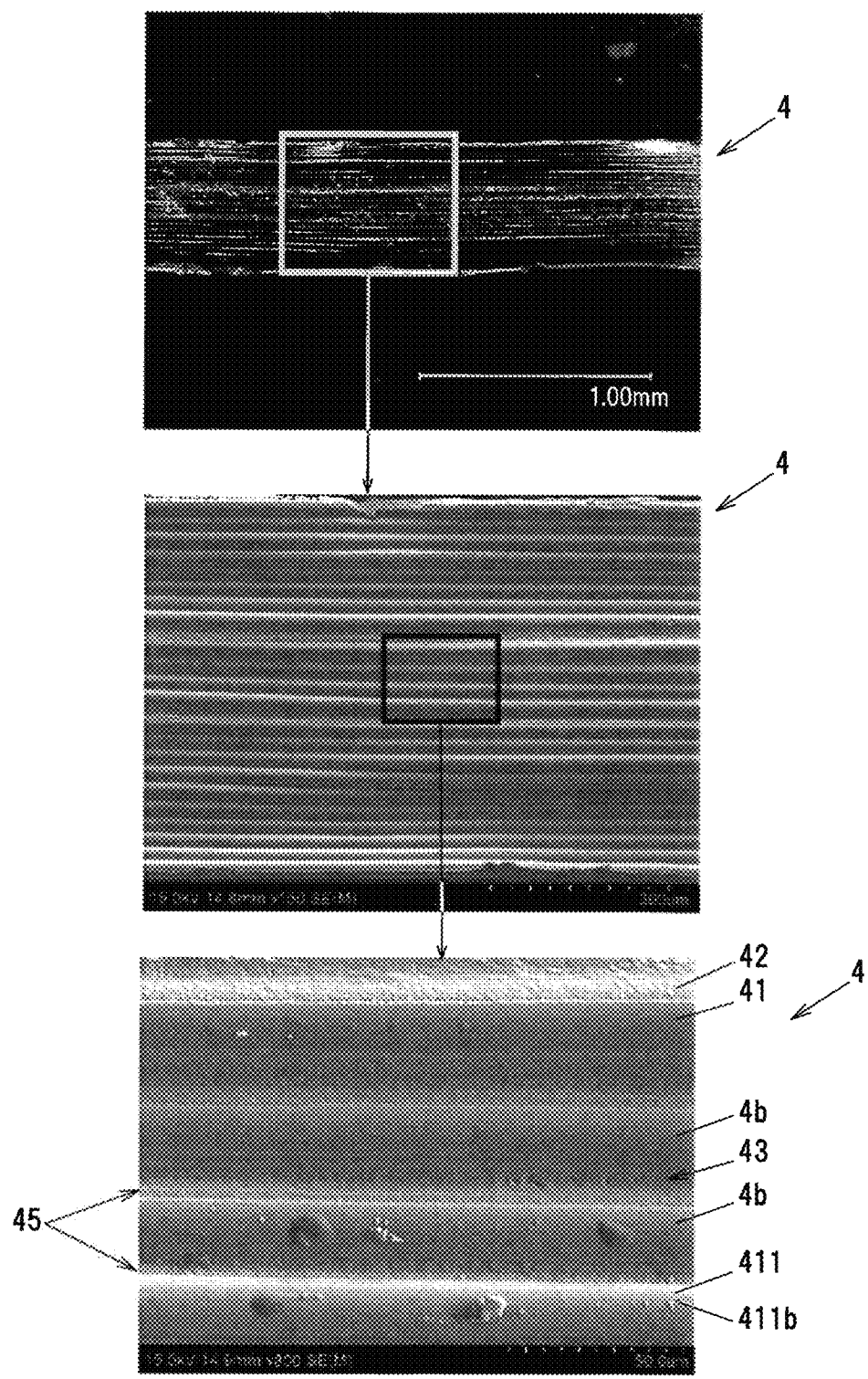
FIG. 3A is a photographic image showing a coaxial cable from which a shield layer is stripped off and observed.
FIG. 3B is a close-up photographic image of the coaxial cable in FIG. 3A.

FIG. 3A is a photographic image showing an actually prepared sample of the coaxial cable 1 from which the shield layer 4 is stripped off and observed, and FIG. 3B is a close-up photographic image of the coaxial cable 1 in FIG. 3A. In the present embodiment, as shown in FIGS. 3A and 3B, in at least a part of the shield layer 4, the batch plating portion 42 constituting a joining portion 43 and the plating layer 411b exposed at the inner peripheral portion 4b are alternately positioned in the direction perpendicular to the longitudinal direction of the metal wire 411, when being viewed from the inward portion in the cable radial direction (in a direction from the surface of the insulator 3 toward the shield layer 4). In other words, when the shield layer is viewed from the inward portion in the radial direction, tin constituting the batch plating portion 42 and silver constituting the plating layer 411b are arranged alternately in stripes.

By providing the joining portion 43 between the adjacent inner peripheral portions 4b, 4b, the batch plating portion 42 would be less likely to crack and less likely to be peeled off when bending or twisting is applied, as compared to the case where all of the metal wires 411, 411 adjacent to each other in the circumference direction are brought into contact to each other, for example. In other words, the joining portion 43, in which the metal wires 411, 411 spaced apart from each other are joined by the batch plating portion 42, is consisted of the batch plating portion 42 composed of the molten plating, which is more flexible than the metal wire 411. When bending or twisting is applied, the batch plating portion 42 of the interconnecting region acts to extend, thereby improving the flexibility of the entire shield layer 4. This makes it difficult for the batch plating portion 42 to crack or peel off when bending or twisting is applied thereto.

As to the distance between the metal wires 411, 411 adjacent to each other in the circumferential direction, the effect described above would be obtained easily when a minimum distance from a surface of one metal wire 411 to a surface of the other metal wire 411 adjacent to the one metal wire 411 is equal to or less than half of the outer diameter of the metal wire 411.

In addition, a thickness W along the radial direction of the batch plating portion 42 at the joining portion 43 (a minimum straight-line distance from an inner surface to an outer surface of the batch plating portion 42 at the joining portion 43) is, e.g., 30% or more of the outer diameter (diameter) d of the metal wire 411 (0.3×d or more), it is less likely to cause the crack in the batch plating portion 42. Particularly when the thickness W of the batch plating portion 42 at the joining portion 43 is greater than or equal to the outer diameter d of the metal wire 411, a bonding strength of the metal wires 411, 411 increases, and it is even more difficult to cause the crack. In the coaxial cable 1, since the batch plating portion 42 has the joining portion 43 as described above, when the cable assembling is carried out, the plurality of metal wires 411 constituting the lateral winding shielding portion 41 are stuck to the batch plating portion 42. Therefore, it is easier to remove the shield layer 4 while winding the plurality of metal wires 411 spirally along the winding direction of the plurality of metal wires 411. For example, an upper limit of the thickness W of the batch plating portion 42 at the joining portion 43 is 130% of the outer diameter d of the metal wire 411 (1.3×d). The outer diameter d of the metal wire 411 is, e.g., 0.02 mm to 0.10 mm. The thickness W of the joining portion 43 and the outer diameter d of the metal wire 411 are obtained by observing the lateral cross section of the coaxial cable 1 (the cross-section perpendicular to the longitudinal direction of the coaxial cable 1) using, e.g., an optical microscope or electron microscope.

For example, if the shield layer 4 is consisted of the lateral winding shielding portion 41, a gap will occur between the metal wires 411, 411 and the noise characteristics will be deteriorated. Moreover, the influence of the gap between the metal wires 411, 411 causes a phenomenon called a suck-out, which causes a rapid attenuation in a predetermined frequency band (for example, the band from 10 GHz to 25 GHz). In the present embodiment, the batch plating portion 42 consisting of the molten plating is provided to cover the entire circumference of the lateral winding shielding portion 41. Therefore, the batch plating portion 42 can block the gap between the metal wires 411, 411, thereby improving the shielding effect. This makes it less likely to cause the loss of signal transmission. Furthermore, by eliminating the gap between the metal wires 411, 411, it is possible to suppress the occurrence of the suck-out.

In addition, by providing batch plating portion 42 to cover the periphery of the lateral winding shielding portion 41, when the sheath 5 is removed at a cable end portion to expose the shield layer 4 during terminal processing, the metal wires 411, 411 becomes difficult to unravel. Therefore, it is possible to easily process the terminal. Furthermore, it is also possible to maintain a stable and constant impedance in the cable longitudinal direction by providing the batch plating portion 42 to cover the periphery of the lateral winding shielding portion 41.

Figure 4A:
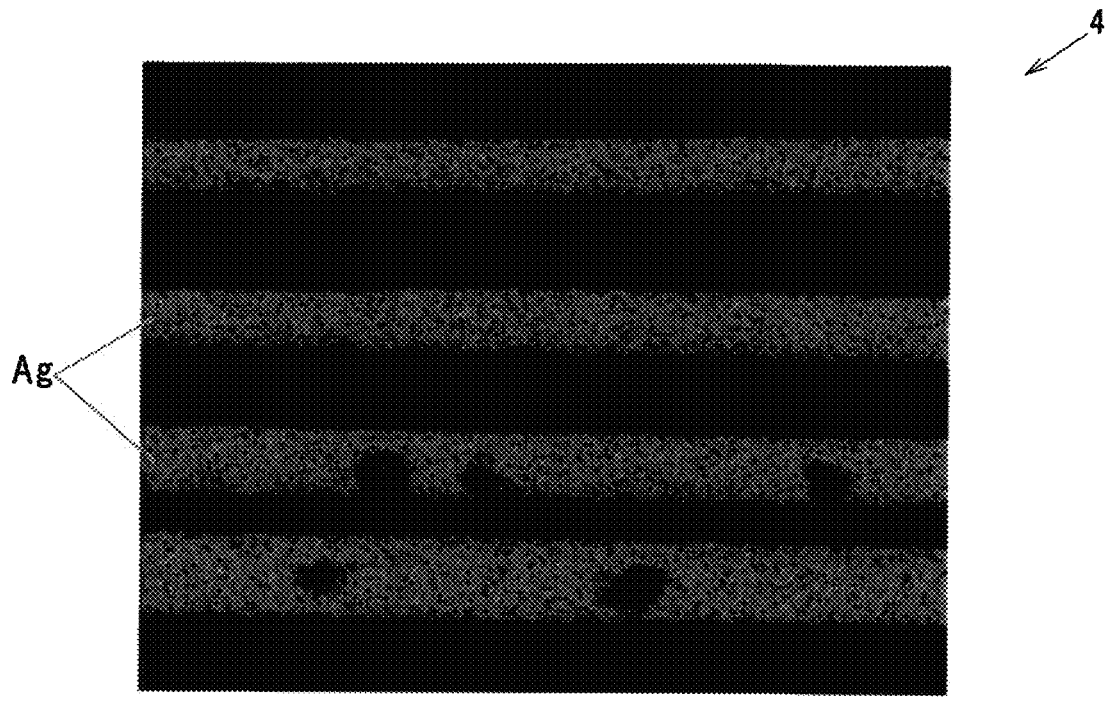
FIG. 4A is a photographic image showing a result of analysis of a region where silver is present in the stripped shield layer.
Figure 4B:
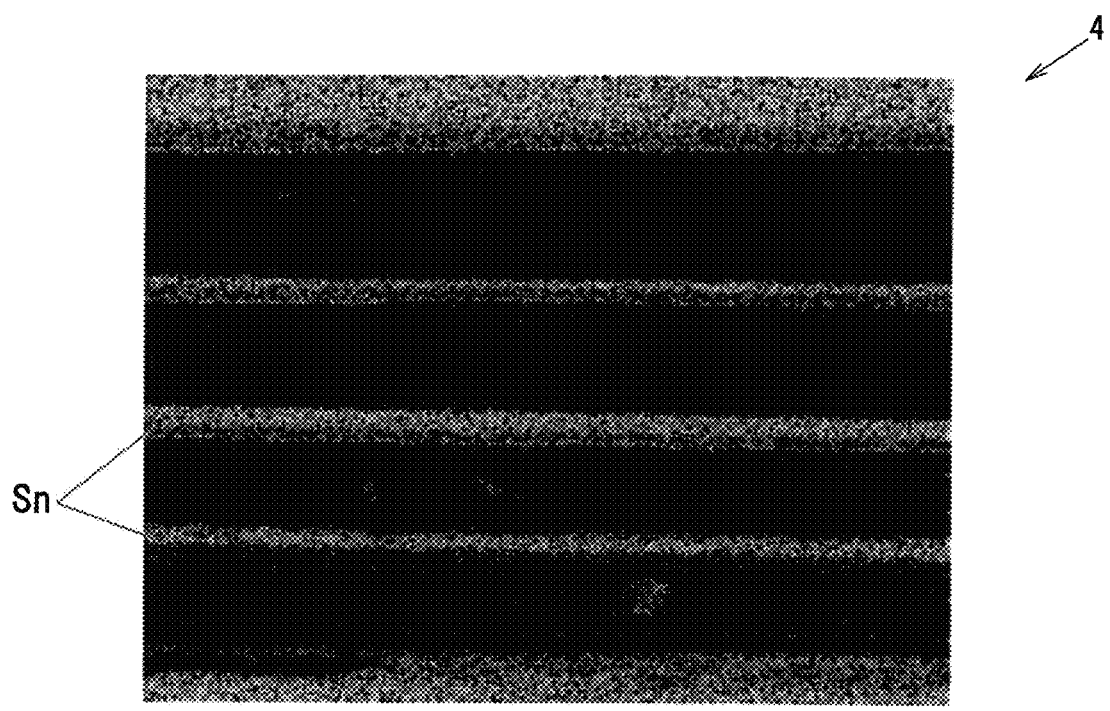
FIG. 4B is a photographic image showing a result of analysis of a region where tin is present in the stripped shield layer.

FIG. 4A is a photographic image showing a result of analysis of a region where silver (Ag) is present in the shield layer 4 which is stripped off from the insulator 3, and FIG. 4B is a photographic image showing a result of analysis of a region where tin (Sn) is present in the shield layer 4 which is stripped off from the insulator 3. Each of FIGS. 4A and 4B shows the state of the stripped shield layer 4 viewed from the inward portion in cable radial direction, and the scale for both images is the same. In FIG. 4A, a light color portion represents the region where silver (Ag) is present, and in FIG. 4B, a light color portion represent the region where tin (Sn) is present. FIGS. 4A and 4B were obtained by performing the element mapping of the data obtained from EDX analysis using SEM.

As shown in FIGS. 4A and 4B, in the shield layer 4, a width of the region where silver (Ag) is present is larger than a width of the region where tin (Sn) is present, when being viewed from the inward portion in the cable radial direction. In the present embodiment, a width of the plating layer 411b exposed at the inner peripheral portion 4b is larger than a width of the batch plating portion 42 constituting the joining portion 43, when being viewed from the inward portion in the cable radial direction. The "width" herein is the width in the alignment direction of the plating layer 411b and the batch plating portion 42 (a vertical direction in FIGS. 4A and 4B), and the width in the direction perpendicular to the longitudinal direction of the metal wire 411.

When the electric current (shielding current) flows from the insulator 3-side to the shield layer 4, it is better to flow this shielding current to the plating layer 411b composed of silver with a high electrical conductivity, resulting in a lower loss and improved transmission characteristics. Therefore, in the present embodiment, the width of the plating layer 411b is larger than the width of the batch plating portion 42 (the joining portion 43) when being viewed from the inward portion in the cable radial direction. Thus, it is possible to improve the transmission characteristics by making it easier for the shielding current to flow to the plating layer 411b. In particular, the larger the width of the plating layer 411b, the larger the region of the inner peripheral portion 4b, and the greater the distance between the insulator 3 and the inner surface of the batch plating portion 42 (the joining portion 43), so that the shielding current flows harder to the batch plating portion 42 composed of tin, thereby further improving the transmission characteristics.

(Characteristic Evaluation of the Coaxial Cable 1)

The coaxial cable 1 was prepared and used as an Example in the present embodiment, and the frequency characteristics were evaluated. The cable length was set to 1 meter. In the coaxial cable 1 in Example, the conductor 2 was formed by collectively twisting seven metal wires 21 each of which is an annealed copper wire with an outer diameter of 0.023 mm, the insulator 3 was prepared by tube extrusion of PFA, the lateral winding shielding portion 41 was formed by spirally winding twenty-two metal wires 411, each of which is Ag-plated annealed copper wire with an outer diameter of 0.025 mm (43AWG), the batch plating portion 42 was prepared from a hot dip plating composed of molten tin, and the sheath 5 was formed from fluorine resin. In the evaluation of the frequency characteristics, the transmission characteristic S21 was measured using a network analyzer. The measurement range was from 10 MHz to 30 GHz and the output power was −8 dBm. The results of the measurement are shown in FIG. 5.

Figure 5:
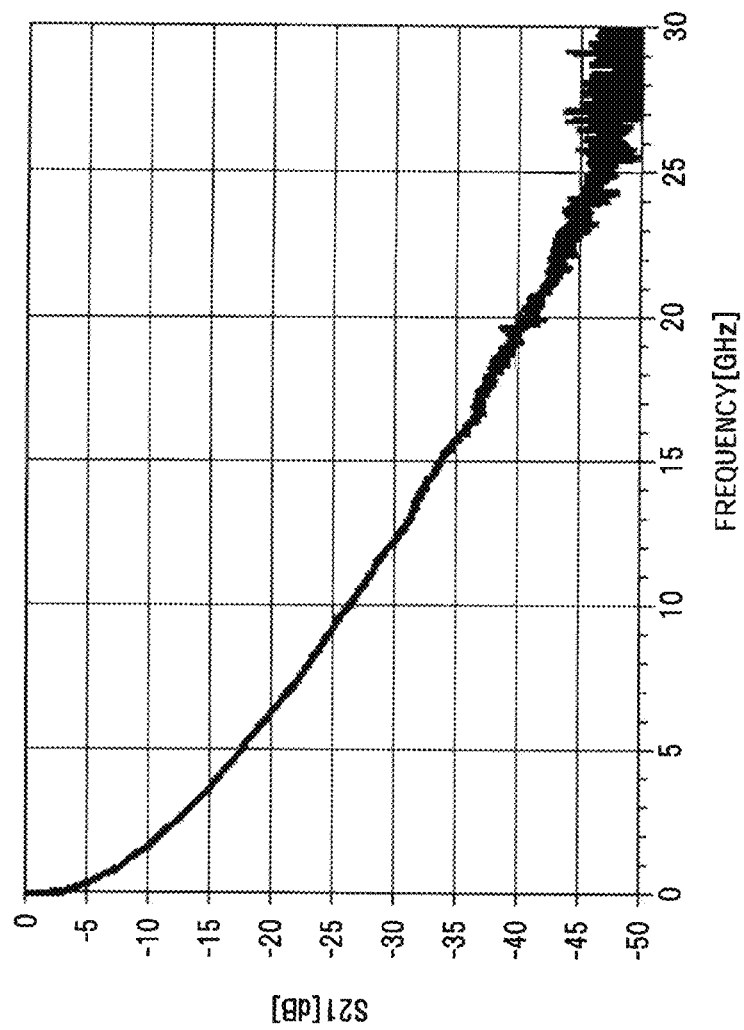
FIG. 5 is a graph showing a result of evaluation of frequency characteristics.

As shown in FIG. 5, it is confirmed that the coaxial cable 1 in Example has no rapid attenuation and the suck-out was suppressed from 20 GHz onwards (e.g., up to 26 GHz). Based on the results in FIG. 5, it is confirmed that the suck-out free was achieved at least in the frequency band of 25 GHz or less.

(Cable Assembly)

Figure 6:
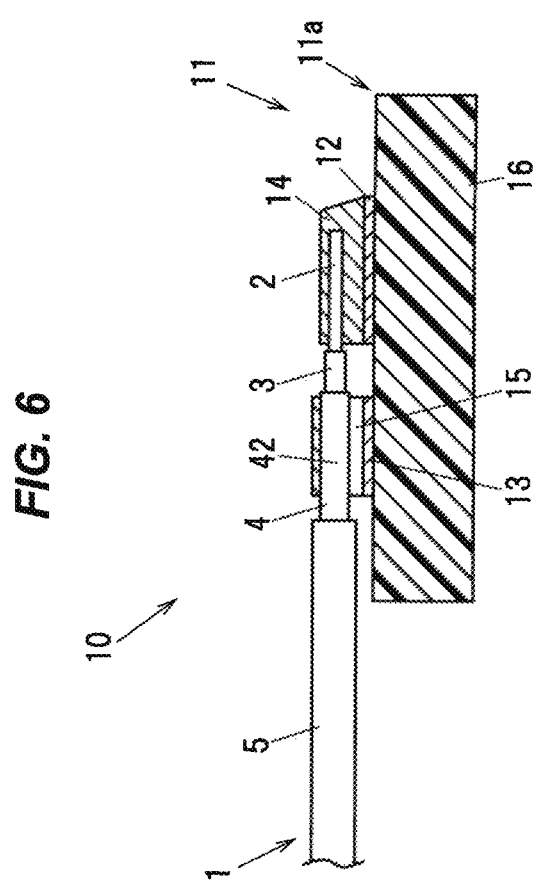
FIG. 6 is a diagram showing a cross-sectional view of a terminal portion of a cable assembly according to the first embodiment of the present invention.

Next, the cable assembly using the coaxial cable 1 will be described below. FIG. 6 is a diagram showing a cross-sectional view of a terminal portion of the cable assembly according to the first embodiment of the present invention.

As shown in FIG. 6, a cable assembly 10 includes the coaxial cable 1 in the present embodiment, and a terminal member 11 provided integrally with at least one end of the coaxial cable 1.

The terminal member 11 is, e.g., a connector, a sensor, a substrate mounted in the connector or sensor, or a board in an electronic device. FIG. 6 shows the case where the terminal member 11 is a substrate 11a. On the substrate 11a, there are formed a signal electrode 12 to which the conductor 2 is connected and a ground electrode 13 to which the shield layer 4 is connected. The substrate 11a is composed of a printed circuit board in which a conductor pattern including the signal electrode 12 and the ground electrode 13 is printed on a base material 16 composed of resin.

At the terminal portion of the coaxial cable 1, the sheath 5 is removed from the terminal for a predetermined length to expose the shield layer 4, and terminal portions of the shield layer 4 and the insulator 3 are further removed to expose the conductor 2. The exposed conductor 2 is secured to the signal electrode 12 with a bonding material 14 such as solder, and the conductor 2 is electrically connected to the signal electrode 12. In addition, the exposed shield layer 4 is secured to the ground electrode 13 with a bonding material 15 such as solder, and the shield layer 4 is electrically connected to the ground electrode 13. The connection of the conductor 2 or the shield layer 4 may be performed without using the bonding material 14 or 15 such as solder. For example, the conductor 2 or the shield layer 4 may be connected by caulking the conductor 2 or the shield layer 4 to be connected to a fixing clasp. In addition, if the terminal member 11 is a connector or sensor, the conductor 2 or the shield layer 4 may be connected directly to the electrode or element.

Functions and Effects of the First Embodiment

As explained above, in the coaxial cable 1 according to the first embodiment, the shield layer 4 includes a lateral winding shielding portion 41, which is formed by the plurality of metal wires 411 being helically wrapped around a periphery of the insulator 3, and the batch plating portion 42 composed of the molten plating and provided to cover the periphery of the lateral winding shielding portion 41. The shield layer 4 further includes the joining portion 43 where the metal wires 411, 411 adjacent to each other in the circumferential direction are joined with each other with the batch plating portion 42 at the gap 45 where the adjacent metal wires 411, 411 are spaced apart from each other. In addition, the shield layer 4 includes the inner peripheral portion 4b where the plurality of the metal wires 411 are not being covered with the batch plating portion 42 and the plating layer 411b is exposed, and the joining portion 43 is provided between the adjacent inner peripheral portions 4b, 4b.

According to this configuration, the shield layer 4 is continuous substantially all around (over the substantially entire periphery) via the batch plating portion 42, so that the gap between the metal wires 411, 411 of the lateral winding shielding portion 41 can be blocked by the batch plating portion 42, thereby improving the noise characteristics and suppressing the occurrence of suck-out. In other words, according to the first embodiment, it is possible to achieve the coaxial cable 1 which is resistant to the degradation in the shielding effect and resistant to the occurrence of the rapid attenuation in a predetermined frequency band (for example, frequency band up to 26 GHz). In addition, by providing the batch plating portion 42 to penetrate between the metal wires 411, 411, the bonding strength between the metal wires 411, 411 can be improved and the batch plating portion 42 will be difficult to peel off.

The Second Embodiment (Suppression of the Effects of Flux Residues)

The description of the second embodiment is common with the first embodiment except for the chlorine present region, so the detailed descriptions are omitted.

As described in the first embodiment, when forming the batch plating portion 42, the flux is applied around the lateral winding shielding portion 41, and then introduced into the plating tank 104 to form the batch plating portion 42 by hot dip plating. The inventors investigated and found that flux residues were present in the shield layer 4 even after the formation of the batch plating portion 42. It was found that the flux residue is present in the region which does not contact the molten tin during the hot dip plating, i.e., the inner peripheral portion 4b in which the metal wire 411 is not being covered with the batch plating portion 42 and the plating layer 411b is exposed. As noted above, since the flux includes chlorine, the presence of the flux residue may cause corrosion in the batch plating portion 42 composed of tin due to the chlorine included in the residue. The corrosion in the batch plating portion 42 may cause, for example, cracks in the joining portion 43 and holes penetrating through the joining portion 43 in the radial direction, which may result in the degradation in shielding effect and the deterioration in transmission characteristics.

Therefore, in the present embodiment, the inventors intended to achieve the coaxial cable 1 with excellent corrosion resistance which suppresses the corrosion in the batch plating portion 42 by reducing chlorine which is the remaining flux component in the inner peripheral portion 4b. More specifically, in the coaxial cable 1 according to the present embodiment, when elemental analysis is performed in any analysis region having an area of 0.015 mm$^2$ or more and 0.300 mm$^2$ or less in an insulator 3-side surface of the shield layer 4 which is stripped from the insulator 3, an area of the chlorine present region where chlorine is present in the analysis region is 5% or less (from 0% to 5%) of the area of the analysis region. Next, the method for analyzing the chlorine present region will be described below in more detail.

(Analysis of the Chlorine Present Region)

FIG. 7 is a flow chart showing a process for analyzing the chlorine present region. As shown in FIG. 7, at step S1, the shield layer 4 should be removed from the insulator 3 in the coaxial cable 1 to be evaluated. Then, at step S2, any region of the insulator 3-side surface (an inner surface of the cable radial direction, an inner peripheral portion 4b-side surface) of the stripped shield layer 4 is set as the analysis region, and the image of this analysis region (see SEM image) is obtained by SEM.

As to the analysis region, if the analysis region is set too wide, evaluation accuracy may deteriorate, and if it is set too narrow, the area of the chlorine present region to be evaluated may differ greatly depending on the selection of the analysis region. Therefore, depending on the size of the coaxial cable 1 to be evaluated (more specifically, the thickness of the metal wire 411), the size of the analysis region (i.e., the magnification of the SEM) must be set accordingly. The inventors examined and confirmed that the appropriate evaluation can be made by setting the area of the analysis region to be 0.015 mm$^2$ or more and 0.300 mm$^2$ or less when the outer diameter d of the metal wire 411 of the lateral winding shielding portion 41 is set to be 0.209 mm or more and 1.020 mm or less.

At step S3, the elemental analysis is performed by EDX analysis and an image of chlorine mapped onto a SEM image (hereinafter referred to as "chlorine mapping image") is obtained. At step S4, an image analysis of the chlorine mapping image is performed to extract the chlorine present region, which is the region where chlorine is present in the analysis region. In this case, a binarization (image thresholding) process is performed between the regions in which chlorine is present and the regions in which chlorine is not present. Also, during the binarization process, it is preferable to calibrate in such a manner that only the regions with an area of 2 µm$^2$ or more are picked up from the regions where chlorine is present. This is because the chlorine present region with a too small area may not be a region including chlorine from flux residues, or it may be a noise in the accuracy of the analysis.

Next, at step S5, the area of the chlorine present regions is determined from the image after the binarization process. As noted above, the regions where chlorine is present with an area less than 2 µm$^2$ are eliminated from the chlorine present regions by the binarization process. In the present embodiment, the sum of the regions with an area of 2 µm$^2$ or more among the regions where chlorine is present in the chlorine mapping image is determined as the area of the chlorine present regions. Then, at step S6, an area ratio of the chlorine present region to the analysis region is determined by the equation below.

Area ratio={(area of chlorine present region)/(area of analysis region)}×100

(Specific Example of the Analysis of the Chlorine Present Region)

Figure 8A:
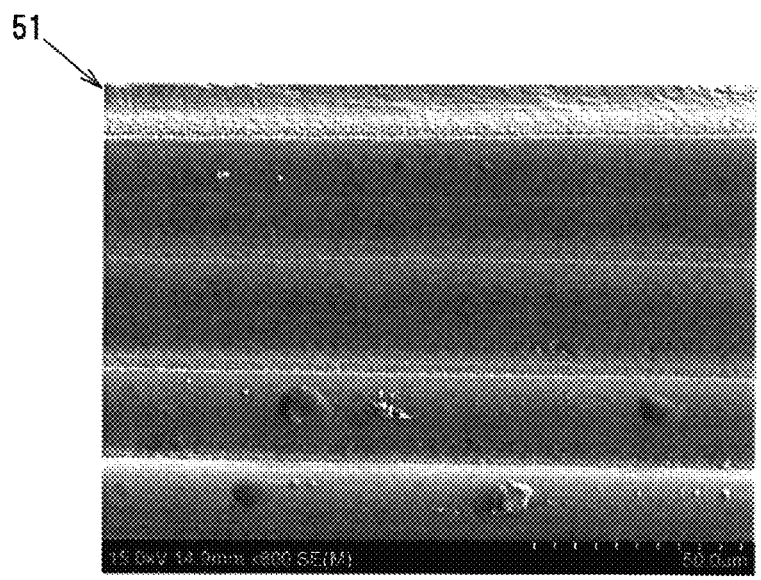
FIG. 8A is a photographic image showing an example of SEM image.
Figure 8B:
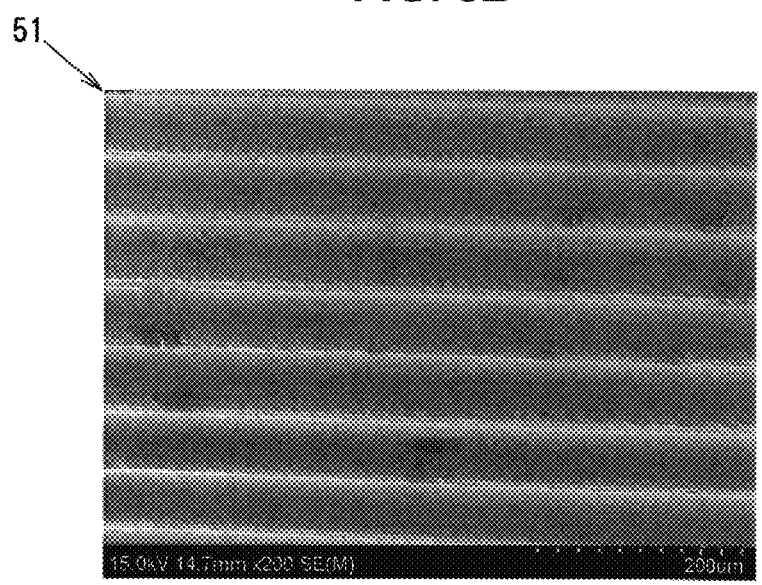
FIG. 8B is a photographic image showing an example of SEM image.

Two coaxial cables 1 without risk of deterioration due to chlorine residues were prepared, and the elemental analysis of the coaxial cables 1 was performed. In the two coaxial cables 1, the outer diameter d of the metal wire 411 was set to 0.209 mm and 1.020 mm, respectively. FIG. 8A shows the image obtained by SEM (SEM image) for the coaxial cable 1 in which the outer diameter d of the metal wire 411 was set to 0.209 mm FIG. 8B shows the image obtained by SEM (SEM image) for the coaxial cable 1 in which the outer diameter d of the metal wire 411 was set to 1.020 mm. An analysis region 51 is an entire SEM image, and the area of the analysis region 51 is the area of the entire SEM image. In FIG. 8A, the magnification factor of the SEM is 800 times, and the area of the analysis region 51 is 18276 µm$^2$ (0.018 mm$^2$). In FIG. 8B, the magnification factor of the SEM is 200 times, and the area of the analysis region 51 is 282238 µm$^2$ (0.28 mm$^2$). Here, S-4800 available from Hitachi High Technology Ltd. was used as the SEM.

Figure 9A:
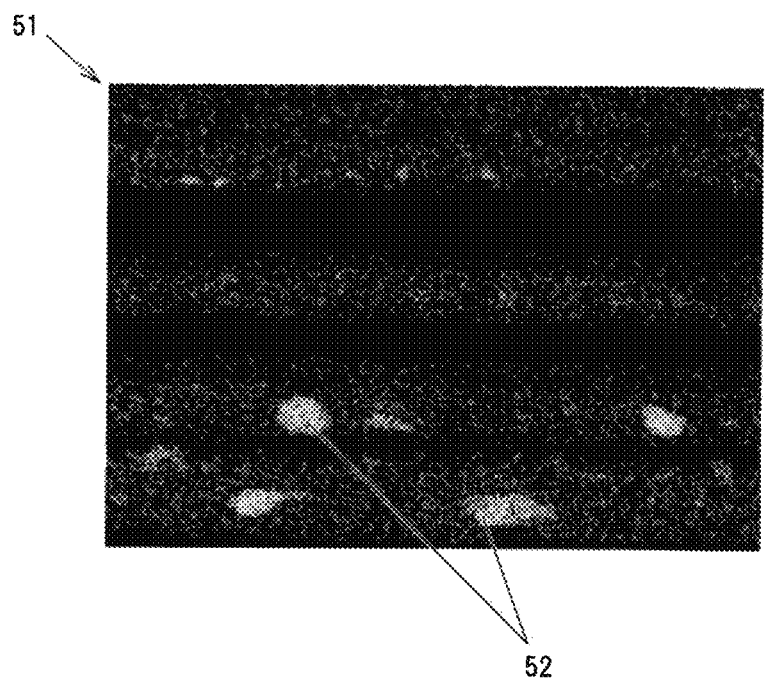
FIG. 9A is a photographic image showing an example of a chlorine mapping image.
Figure 9B:
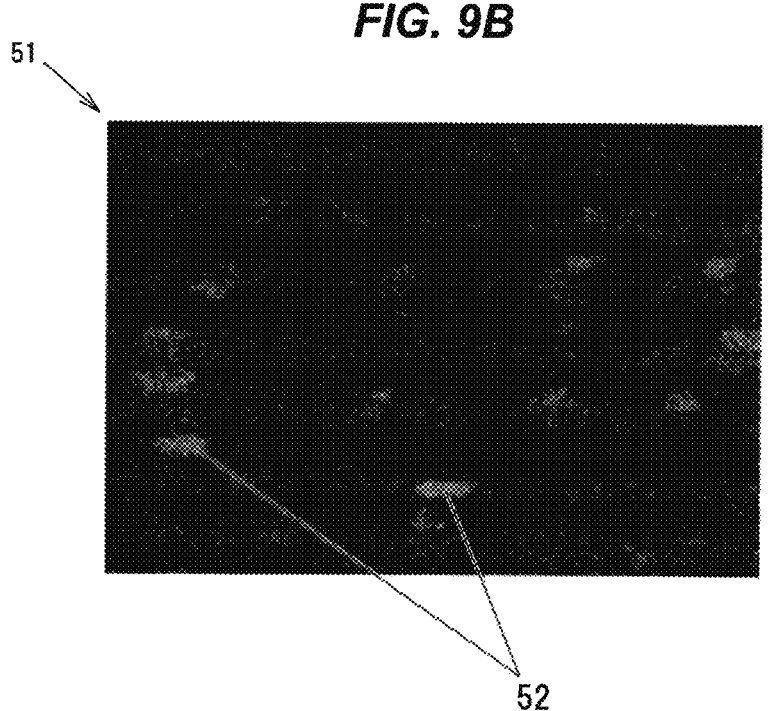
FIG. 9B is a photographic image showing an example of a chlorine mapping image.

In each of cases shown in FIGS. 8A and 8B, the elemental analysis was performed by EDX analysis, and the chlorine mapping images were obtained by mapping chlorine on the SEM image. The chlorine mapping images thus obtained are shown in FIGS. 9A and 9B. In FIGS. 9A and 9B, light color regions represent the regions where chlorine is present, namely, the chlorine present regions 52. The elemental analysis was conducted using Octane Elect Super available from EDAX (AMETEK Inc.).

Then, based on the obtained chlorine mapping images in FIGS. 9A and 9B, the area of the chlorine regions 52 was determined by analyzing the images using microscopes. At this time, the binarization processing of the regions where chlorine is present and the regions where chlorine is not present was performed in the analysis region 51, and the area of the chlorine present regions 52 was determined from the image after the binarization process. In the binarization process, the calibration was performed to pick up only the regions with an area of 2 µm$^2$ or more from the regions where chlorine is present in the chlorine mapping image. As a result, in the example in FIG. 9A, the area of chlorine present regions 52 was 601 µm$^2$, and in the example in FIG. 9B, the area of chlorine present regions 52 was 12302 µm$^2$. As a microscope, VHX-5000 available from Keyence Corporation was used.

Then, the proportion (area ratio) of the area of the chlorine present regions 52 to the area of the analysis region 51 was calculated. In the example shown in FIG. 9A, the area of the analysis region 51 was 18276 µm$^2$ and the area of the chlorine present regions 52 was 601 µm$^2$, so the area of the chlorine present regions 52 is 3.289% of the area of the analysis region 51. Similarly, in the example shown in FIG. 9B, the area of the analysis region 51 was 282238 µm$^2$ and the area of the chlorine present regions 52 was 12302 µm$^2$, so the area of the chlorine present regions 52 is 4.359% of the area of the analysis region 51. The results of the analysis are summarized in Table 1.

TABLE 1

| | | |
|---|---|---|
| Outer diameter of metal wire | 0.209 mm | 1.020 mm |
| Area of Analysis Region | 18276 µm$^2$ | 282238 µm$^2$ |
| Area of Chlorine Present Region | 601 µm$^2$ | 12302 µm$^2$ |
| Area ratio of Chlorine Present Region to Analysis Region | 3.289% | 4.359% |

As shown in Table 1, in both coaxial cables 1, the area ratio (CL area ratio) of the chlorine present regions 52 to the analysis region 51 is not greater than 5%. In other words, by reducing the area ratio of the chlorine present regions 52 to the analysis region 51 to be 5% or less, it is possible to achieve the coaxial cable 1 with reduced degradation due to chlorine residues. In addition, the area of the analysis region 51 is 18276 µm$^2$ and 282238 µm$^2$ for the coaxial cables 1, respectively, as shown in Table 1. According to the inventors' contemplation, the precise evaluation of the area ratio of the chlorine present regions 52 can be made by setting the area of the analysis region 51 to be 0.015 mm$^2$ or more and 0.300 mm$^2$ or less (more preferably, 0.018 mm$^2$ or more and 0.280 mm$^2$ or less).

(Cable Assembly)

The cable assembly using the coaxial cable 1 in the second embodiment is similar to the first embodiment. Therefore, the description thereof is omitted.

Functions and Effects of the Second Embodiment

As explained above, in the coaxial cable 1 according to the second embodiment, the shield layer 4 includes a lateral winding shielding portion 41, which is formed by the plurality of metal wires 411 being helically wrapped around a periphery of the insulator 3, and the batch plating portion 42 composed of the molten plating and provided to cover the periphery of the lateral winding shielding portion 41. The shield layer 4 includes the inner peripheral portion 4b where the plurality of the metal wires 411 are not being covered with the batch plating portion 42 and the plating layer 411b is exposed, and when the elemental analysis is performed in any analysis region having an area of 0.015 mm$^2$ or more and 0.300 mm$^2$ or less in the insulator 3-side surface of the shield layer 4 which is stripped from the insulator 3, the area of the chlorine present region where chlorine is present in the analysis region is 5% or less of the area of the analysis region.

According to this configuration, the shield layer 4 is continuous substantially all around (over the substantially entire periphery) via the batch plating portion 42, so that the gap between the metal wires 411, 411 of the lateral winding shielding portion 41 can be blocked by the batch plating portion 42, thereby improving the noise characteristics and suppressing the occurrence of suck-out. In other words, according to the first embodiment, it is possible to achieve the coaxial cable 1 which is resistant to the degradation in the shielding effect and resistant to the occurrence of the rapid attenuation in a predetermined frequency band (for example, frequency band up to 26 GHz). In addition, by reducing the chlorine present regions 52, it is possible to suppress the corrosion of the batch plating portion 42 due to residual chlorine, resulting in the coaxial cable 1 with less characteristics degradation even in long-term use.

Summary of the Embodiments

Next, the technical ideas grasped from the aforementioned embodiments will be described with the aid of the reference characters and the like in the embodiments. It should be noted, however, that each of the reference characters and the like in the following descriptions is not to be construed as limiting the constituent elements in the appended claims to the members and the like specifically shown in the embodiments.

[1] A coaxial cable (1) comprising a conductor (2); an insulator (3) covering a periphery of the conductor (2); a shield layer (4) covering a periphery of the insulator (3); and a sheath (5) covering a periphery of the shield layer (4), wherein the shield layer (4) includes a lateral winding shielding portion (41) comprising a plurality of metal wires (411) being helically wrapped around the periphery of the insulator (3) to cover the periphery of the insulator (3), and a batch plating portion (42) comprising a hot dip plating, which is covering a periphery of the lateral winding shielding portion (41), wherein the shield layer (4) includes a joining portion (43) where the metal wires (411, 411) adjacent to each other in a circumferential direction are joined with each other with the batch plating portion (42) at a gap (45) where adjacent ones of the plurality of metal wires (411, 411) are spaced apart from each other, wherein the shield layer (4) includes inner peripheral portions (4b) where the plurality of the metal wires (411) are not being covered with the batch plating portion (42) and plating layers (411b) are exposed, and wherein the joining portion (43) is provided between adjacent ones of the inner peripheral portions (4b, 4b).

[2] The coaxial cable (1) as defined in the above [1], wherein, in at least a part of the shield layer (4), the batch plating portion (42) constituting the joining portion (43) and the plating layer (411b) exposed at the inner peripheral portion (4b) are alternately positioned in a direction perpendicular to a longitudinal direction of the metal wire (411), when being viewed from an inward portion in a cable radial direction.

[3] The coaxial cable (1) as defined in the above [2], wherein a width of the plating layer (411b) exposed at the inner peripheral portion (4b) is larger than a width of the batch plating portion (42) constituting the joining portion (43), when being viewed from the inward portion in the cable radial direction.

[4] The coaxial cable (1) as defined in any one of the above [1] to [3], wherein the plating layer (411b) is configured to be higher in electrical conductivity than the batch plating portion (42).

[5] The coaxial cable (1) as defined in any one of the above [1] to [4], wherein the plating layer (411b) comprises silver, and the batch plating portion (42) comprises tin.

[6] The coaxial cable (1) as defined in any one of the above [1] to [5], wherein the shield layer (4) includes outer peripheral portions (4a) where the plurality of the metal wires (411) are being covered with the batch plating portion (42), wherein the outer peripheral portion (4a) includes an intermetallic compound (411c) between the plurality of metal wires (411) and the batch plating portion (42).

[7] A cable assembly (10) comprising the coaxial cable (1) as defined in any one of the above [1] to [6]; and a terminal member (11) integrally provided to at least one end portion of the coaxial cable (1).

[8] A coaxial cable (1) comprising a conductor (2); an insulator (3) covering a periphery of the conductor (2); a shield layer (4) covering a periphery of the insulator (3); and a sheath (5) covering a periphery of the shield layer (4), wherein the shield layer (4) includes a lateral winding shielding portion (41) comprising a plurality of metal wires (411) being helically wrapped around the periphery of the insulator (3) to cover the periphery of the insulator (3), and a batch plating portion (42) comprising a hot dip plating, which is covering a periphery of the lateral winding shielding portion (41), and wherein when an elemental analysis is performed in any analysis region (51) having an area of 0.015 mm$^2$ or more and 0.300 mm$^2$ or less in an insulator (3)-side surface of the shield layer (4) which is stripped from the insulator (3), an area of a chlorine present region (52) where chlorine is present in the analysis region is 5% or less of an area of the analysis region (51).

[9] The coaxial cable (1) as defined in the above [8], wherein the elemental analysis is performed by analysis by energy dispersion type X-ray spectroscopy using a scanning electron microscope.

[10] The coaxial cable (1) as defined in the above [8] or [9], wherein a binarization process is performed between regions in which chlorine is present and regions in which chlorine is not present in the analysis region (51), and the area of the chlorine present region (52) is calculated based on an image after the binarization process.

[11] The coaxial cable (1) as defined in the above [10], wherein the area of the chlorine present region (52) is a sum of regions with an area of 2 μm$^2$ or more among the regions where chlorine is present.

[12] The coaxial cable (1) as defined in any one of the above [8] to [11], wherein an outer diameter of the metal wire (411) of the lateral winding shielding portion (41) is 0.209 mm or more and 1.020 mm or less.

[13] The coaxial cable (1) as defined in any one of the above [8] to [12], wherein the shield layer (4) includes a joining portion (43) where the metal wires (411, 411) adjacent to each other in a circumferential direction are joined with each other with the batch plating portion (42) at a gap (45) where adjacent ones of the plurality of metal wires (411, 411) are spaced apart from each other, wherein the shield layer (4) includes inner peripheral portions (4b) where the plurality of the metal wires (411) are not being covered with the batch plating portion (42) and plating layers (411b) are exposed, and wherein the joining portion (43) is provided between adjacent ones of the inner peripheral portions (4b, 4b).

[14] The coaxial cable (1) as defined in any one of the above [8] to [13], wherein the plating layer (411b) comprises silver, and the batch plating portion (42) comprises tin.

[15] The coaxial cable (1) as defined in any one of the above [8] to [14], wherein the shield layer (4) includes outer peripheral portions (4a) where the plurality of the metal wires (411) are being covered with the batch plating portion (42), wherein the outer peripheral portion (4a) includes an intermetallic compound (411c) between the plurality of metal wires (411) and the batch plating portion (42).

[16] A cable assembly (10) comprising the coaxial cable (1) as defined in any one of the above [8] to [15]; and a terminal member (11) integrally provided to at least one end portion of the coaxial cable (1).

Although the embodiments of the present invention have been described above, the aforementioned embodiments are not to be construed as limiting the inventions according to the appended claims. Further, it should be noted that not all the combinations of the features described in the embodiments are indispensable to the means for solving the problem of the invention. Further, the present invention can be appropriately modified and implemented without departing from the spirit thereof.

The present invention can also be modified appropriately without deviating from its intended purpose. For example, in the second embodiment, the elemental analysis was performed by EDX analysis using SEM, but the elemental analysis may be performed by other methods. For example, the elemental analysis can also be performed using the Electron Probe Micro Analyzer (EPMA) or Auger Electron Spectroscopy (AES).

What is claimed is:

1. A coaxial cable comprising:
a conductor;
an insulator covering a periphery of the conductor;
a shield layer covering a periphery of the insulator; and
a sheath covering a periphery of the shield layer,
wherein the shield layer includes a lateral winding shielding portion comprising a plurality of metal wires being helically wrapped around the periphery of the insulator to cover the periphery of the insulator, and a batch plating portion comprising a hot dip plating, which is covering a periphery of the lateral winding shielding portion,
wherein the shield layer includes a joining portion where the plurality of metal wires adjacent to each other in a circumferential direction are joined with each other with the batch plating portion at a gap where adjacent ones of the plurality of metal wires are spaced apart from each other,
wherein the shield layer includes inner peripheral portions where the plurality of metal wires are not being covered with the batch plating portion and plating layers are exposed,
wherein the joining portion is provided between adjacent inner peripheral portions of the inner peripheral portions,
wherein the shield layer includes outer peripheral portions where the plurality of the metal wires are being covered with the batch plating portion,
wherein an outer peripheral portion of the outer peripheral portions includes an intermetallic compound between the plurality of metal wires and the batch plating portion, wherein the shield layer is configured to be higher in electrical conductivity in an inner peripheral portion of the inner peripheral portions than the outer peripheral portion, and wherein an outer peripheral surface of the joining portion is located radially outward with respect to outer peripheral surfaces of the outer peripheral portions.

2. The coaxial cable according to claim 1, wherein, in at least a part of the shield layer, the batch plating portion constituting the joining portion and a plating layer of the plating layers exposed at the inner peripheral portion are alternately positioned in a direction perpendicular to a longitudinal direction of the metal wire, when being viewed from an inward portion in a cable radial direction.

3. The coaxial cable according to claim 2, wherein a width of the plating layer exposed at the inner peripheral portion is larger than a width of the batch plating portion constituting the joining portion, when being viewed from the inward portion in the cable radial direction.

4. The coaxial cable according to claim 1, wherein a plating layer of the plating layers is configured to be higher in electrical conductivity than the batch plating portion.

5. The coaxial cable according to claim 1, wherein a plating layer of the plating layers comprises silver, and the batch plating portion comprises tin.

6. A cable assembly comprising:
the coaxial cable according to claim 1; and
a terminal member integrally provided to at least one end portion of the coaxial cable.

7. The coaxial cable according to claim 1, wherein, in a portion around an inner peripheral portion of the plurality of metal wires absent the batch plating portion, an air layer is between the inner peripheral portions of the adjacent metal wires and between the insulator and the batch plating portion.

8. The coaxial cable according to claim 1, wherein an inner surface of the joining portion, opposite to an outer surface of the insulator, comprises a curved shape that recesses toward an inner side of the joining portion.

9. A coaxial cable comprising:
a conductor;
an insulator covering a periphery of the conductor;
a shield layer covering a periphery of the insulator; and
a sheath covering a periphery of the shield layer,
wherein the shield layer includes a lateral winding shielding portion comprising a plurality of metal wires being helically wrapped around the periphery of the insulator to cover the periphery of the insulator, and a batch plating portion comprising a hot dip plating, which is covering a periphery of the lateral winding shielding portion,
wherein when an elemental analysis is performed in any analysis region having an area of 0.015 mm$^2$ or more and 0.300 mm$^2$ or less in an insulator-side surface of the shield layer which is stripped from the insulator,
wherein an area of a chlorine present region, where chlorine is present in the analysis region, comprises 5% or less of an area of the analysis region,
wherein the chlorine is present in an inner peripheral portion in the shield layer,
wherein the shield layer includes a joining portion where the plurality of metal wires adjacent to each other in a circumferential direction are joined with each other with the batch plating portion at a gap where adjacent ones of the plurality of metal wires are spaced apart from each other,
wherein the shield layer includes outer peripheral portions where the plurality of the metal wires are being covered with the batch plating portion, and
wherein an outer peripheral surface of the joining portion is located radially outward with respect to outer peripheral surfaces of the outer peripheral portions.

10. The coaxial cable according to claim 9, wherein the elemental analysis is performed by analysis by energy dispersion type X-ray spectroscopy using a scanning electron microscope.

11. The coaxial cable according to claim 9, wherein the analysis region includes a plurality of chlorine present regions including the chlorine present region,
wherein a binarization process is performed between the chlorine present regions and a plurality of regions in which chlorine is not present in the analysis region, and
the area of the chlorine present regions is calculated based on an image after the binarization process.

12. The coaxial cable according to claim 11, wherein the area of the chlorine present regions is a sum of chlorine present regions with an area of 2 μm$^2$ or more among the chlorine present regions.

13. The coaxial cable according to claim 9, wherein an outer diameter of a metal wire of the plurality of metal wires of the lateral winding shielding portion is 0.209 mm or more and 1.020 mm or less.

14. The coaxial cable according to claim 9,
wherein the shield layer includes inner peripheral portions where the plurality of the metal wires are not being covered with the batch plating portion and plating layers are exposed, and
wherein the joining portion is provided between adjacent inner peripheral portions of the inner peripheral portions.

15. The coaxial cable according to claim 14, wherein a plating layer of the plurality of plating layers comprises silver, and the batch plating portion comprises tin.

16. The coaxial cable according to claim 14, wherein, in a portion around an inner peripheral portion of the plurality of metal wires absent the batch plating portion, an air layer is between the inner peripheral portions of the adjacent metal wires and between the insulator and the batch plating portion.

17. The coaxial cable according to claim 9,
wherein an outer peripheral portion of the plurality of outer peripheral portions includes an intermetallic compound between the plurality of metal wires and the batch plating portion.

18. A cable assembly comprising:
the coaxial cable according to claim 9; and
a terminal member integrally provided to at least one end portion of the coaxial cable.

19. The coaxial cable according to claim 9, wherein an inner surface of the joining portion, opposite to an outer surface of the insulator, comprises a curved shape that recesses toward an inner side of the joining portion.

* * * * *